Patented Oct. 25, 1949

2,485,682

UNITED STATES PATENT OFFICE 2,485,682

PROCESS OF POLYMERIZING A CONJUGATED DIENE IN THE PRESENCE OF A REGULATOR COMPRISING SELECTED AMIDES OF MERCAPTYL UNDECANOIC ACIDS

Karl H. Weber, Washington, D. C., assignor to Armstrong Cork Company, Lancaster, Pa., a corporation of Pennsylvania No Drawing. Original application March 10, 1944, Serial No. 525,947. Divided and this application September 17, 1947, Serial No. 774,673

12 Claims. (Cl. 260—82.7)

This application is a division of my copending application Serial No. 525,947, filed March 10, 1944.

The present invention relates to improvements in polymerizing one or more open chain, aliphatic conjugated dienes containing 4 to 6 carbon atoms in aqueous emulsions and to a new polymerization regulator selected from the group consisting of the amides of 10-mercaptyl and 11-mercaptyl undecanoic acid.

An open chain, aliphatic conjugated diene containing 4 to 6 carbon atoms, for example, butadiene-1,3, can be polymerized by simply heating or in an aqueous emulsion. The latter method is preferred as it yields products which more nearly resemble natural rubber. In general, such a conjugated diene is usually polymerized with a copolymerizable compound including a vinyl radical. The emulsion polymerization may result in the formation of products which are relatively dry and which more nearly resemble vulcanized natural rubber rather than the unvulcanized natural rubber with the result that the polymerization products are relatively difficult to work on the mills and the incorporation therewith of the ingredients which are necessary for effecting vulcanization is accomplished with considerable difficulty. To overcome these and other disadvantages, it has been the practice to incorporate in the emulsion a so-called "polymerization regulator." A satisfactory polymerization regulator should produce a synthetic rubber-like material which is relatively plastic and in which vulcanizing ingredients may be readily incorporated and which resembles unvulcanized natural rubber.

While the exact effect of such regulators is obscure, I believe that they tend to give a narrower range of polymer size so that all the polymers are more nearly the same length. Further, I believe that they tend to reduce cross-linking of the polymers as is evidenced by the increased benzene or acetone solubility, though it should be understood that I do not intend to be limited to any particular theory.

It is the object of the present invention to provide new compounds which are useful polymerization regulators, which expedite polymerization of aliphatic conjugated dienes or the polymerization of aliphatic conjugated dienes with unsaturated copolymerizable compounds containing a vinyl radical in an aqueous emulsion without unduly retarding the course of the reaction and without involving the formation of undesirable products. Other objects of my invention will become more apparent from the following description and claims.

I have discovered that the amides of either 10- or 11-mercaptyl undecanoic acid are desirable polymerization regulators for the polymerization in aqueous emulsions of the above-mentioned compounds. In most cases, from about 0.3% to about 1% of the polymerization regulator (calculated on the total weight of the monomeric polymerizable ingredients) is sufficient to exert the desired effect though it will be understood that the amount of regulator used with a particular formulation will depend at least in part upon the materials being polymerized and upon the characteristics desired in the final product. Too great an amount of regulator tends to unduly slow down the rate of polymerization while too small an amount of regulator will not be as effective as may be desired. The preferred amount of polymerization regulator will be readily apparent to one skilled in the art.

My polymerization regulators may be employed as an aid in polymerizing any aliphatic conjugated diene containing from 4 to 6 carbon atoms; as an aid in polymerizing mixtures of such dienes; or as an aid in polymerizing a mixture of one or more such dienes with one or more copolymerizable compounds including a vinyl radical. The phrase "aliphatic conjugated diene containing from 4 to 6 carbon atoms" is intended to include butadiene-1,3 and the homologues and derivatives of butadiene-1,3, such as isoprene, 2,3-dimethyl butadiene-1,3, chloroprene, bromoprene, iodoprene, and the like.

The phrase "copolymerizable compound including a vinyl radical" is intended to include all compounds containing the group $CH_2=C<$ which may be copolymerized with such a diene in an aqueous emulsion. For example, the copolymerizable compounds include styrene, alpha-methyl styrene, alpha-methyl-para-methyl-styrene, acrylonitrile, methyl methacrylate, the vinyl esters of the higher fatty acids, such as the vinyl esters of the acids obtainable by saponification of a drying oil, the allyl esters of the higher fatty acids, or the like, or mixtures thereof.

The polymerization regulator may be any amide of an acid having the following formula:

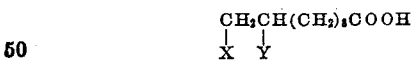

in which X and Y consist of H and SH radicals. The H and SH radicals may be in either sequence, that is, either X or Y may represent H or SH, but X and Y in no event are the same.

Thus, these amides are amides of either 10-mercaptyl undecanoic acid or 11-mercaptyl undecanoic acid. For example, the polymerization regulators may be 11-mercaptyl undecanoamide, $SH(CH_2)_{10}CONH_2$; 10-mercaptyl undecanoamide, $CH_3SHCH(CH_2)_8CONH_2$; 11-sulfhydryl-undecanoanilide, $SH(CH_2)_{10}CONHC_6H_5$; or 11-sulfhydryl-N-cyclohexyl-undecanoamide; or the like; or mixtures thereof.

My new polymerization regulators may be prepared in any suitable manner or may be prepared as hereinafter described. Unless otherwise set forth, all parts and percentages are by weight.

For example, a mixture of 11-mercaptyl undecanoamide and 10-mercaptyl undecanoamide was prepared by bubbling hydrogen bromide through a solution of 50 grams of undecylenic acid (melting point 21–22° C.) in 350 cc. of purified heptane for 45 minutes. The resultant bromo-undecanoic acid which was predominantly 11-bromo-undecanoic acid including a minor amount of 10-bromo-undecanoic acid, separated out as relatively fine crystals from the solution upon cooling to −18° C. These crystals were filtered and then dried in air.

A mixture of 34.2 grams of the above-mentioned bromo-undecanoic acid crystals and 58 grams of thonyl chloride were refluxed for one hour. The resulting bromo-undecanoyl chloride was dropped slowly into about 200 cc. of concentrated ammonia hydroxide at 0° C. The amide separated out as light brown crystals which were filtered, washed with water, and recrystallized from ethyl alcohol. A solution of 26.4 grams of this bromo-undecanoamide and 7.6 grams of thiourea in 50 cc. of ethyl alcohol were heated under reflux for three hours and then 12.6 grams of sodium bicarbonate in 60 cc. of water were added and the heating continued for about two hours to form the mercaptyl undecanoamide which melted at 89.5–90.5° C. This amide was predominantly 11-mercaptyl undecanoamide containing a minor amount of 10-mercaptyl undecanoamide.

A secondary amide was prepared by heating 62 grams of crude 10-undecylenic acid (melting point 14–16° C.) and 35 grams of aniline over an oil bath at 190–205° C. A water trap was used to catch any water that distilled over. Heating was continued until approximately 4 cc. of water had distilled over, and the reaction time was approximately 2½ hours. On being poured into cold water, the product solidified and was separated by filtration. The product was then washed successively with dilute sodium hydroxide solution, water, dilute hydrochloric acid, and then again with water. The washed product was crystallized in two fractions in dilute alcohol; the first and cruder fraction was then recrystallized from a mixture of ether and petroleum ether. About 36 grams of these crystals of undecanoanilide (melting point 56–59° C.) were dissolved in 200 cc. of benzene along with 1 cc. of 3% hydrogen peroxide. A stream of hydrogen bromide gas was then passed through the solution for a period of 1½ hours. During this time, the solution was cooled in an ice bath. The solution was washed with water and then with dilute sodium bicarbonate solution and thereafter dried over sodium sulphate and filtered. "Skelysolve B," a petroleum hydrocarbon solvent, was added until the solution became turbid. The solution was allowed to stand overnight in a refrigerator, and the crystals were then removed by filtration and dried. About 22 grams of these crystals of 11-bromo-undecanoanilide (melting point 55–56° C.) and 5.4 grams of thiourea were dissolved in 45 cc. of 95% ethyl alcohol. Five drops of concentrated ammonium hydroxide were added and the solution refluxed for about three hours. Then a solution of 8.4 grams of sodium bicarbonate and 50 cc. of water was added and the refluxing continued for an additional half hour. The product was extracted from the water with benzene. The benzene solution was dried over calcium sulphate, concentrated, and the product crystallized by the addition of petroleum ether. These crystals were 11-sulhydryl-undecanoanilide, having the formula $$SH(CH_2)_{10}CONHC_6H_5$$

A different secondary amide was prepared by refluxing for about five hours a mixture of 46 grams of crude 10-undecylenic acid, 25 grams of cyclohexylamine and 30 cc. of toluene. After about five hours and after about 3½ cc. of water had distilled over, the excess toluene was removed by distillation. Upon being poured into cold water, the product solidified. The product was filtered and then washed successively with dilute hydrochloric acid, dilute sodium hydroxide, and then again with water. The N-cyclohexyl-10-undecanoamide was crystallized from dilute alcohol and then from a mixture of ether and petroleum ether. About 30 grams of this amide was dissolved in 100 cc. of benzene and 5 drops of 30% hydrogen peroxide were added. A stream of hydrogen bromide gas was passed through the solution for a period of about one hour. After standing for about one-half hour, the solution was washed with water and then with dilute sodium bicarbonate solution and thereafter dried over calcium sulphate and filtered. Petroleum ether was added to the benzene solution and the container cooled whereupon the 11-bromo-N-cyclohexyl-undecanoamide crystallized. About 28 grams of this last-mentioned amide and 6.3 grams of thiourea were dissolved in 50 cc. of water and the solution refluxed for three hours. Then a solution of 10 grams of sodium bicarbonate and 70 cc. of water was added and the refluxing continued for an additional one-half hour. This solution was concentrated by removing part of the benzene and thereafter petroleum ether was added until the solution became cloudy. This mixture was cooled, and the crystals of 11-sulfhydryl-N-cyclohexyl-undecanoamide were separated by filtration.

The following examples serve to illustrate the use of my polymerization regulators without limiting them to the particular proportions or ingredients.

*Example 1*

A synthetic rubber-like material was prepared as follows:

| | Parts |
|---|---|
| Butadiene-1,3 | 180 |
| Styrene | 60 |
| Water | 295 |
| Sodium stearate (emulsifying agent) | 24 |
| Sodium hydroxide | 0.1 |
| Potassium persulfate (polymerization catalyst) | 1.2 |
| Primary amide predominantly consisting of 11-mercaptyl undecanoamide containing a minor amount of 10-mercaptyl undecanoamide | 2.4 |

The emulsion was shaken for 7 days at room temperature and the latex then coagulated. The rubber-like product was in many respects similar to unvulcanized natural rubber and was more plastic and cohesive than the usual butadiene-styrene (Buna S) type of rubber-like material. This product can be compounded and vulcanized as is customary with rubber.

Example 2

A similar rubber-like material was prepared as set forth in Example 1, except that only 1.2 parts of the same mercaptyl undecanoamide was used. The product was relatively plastic and cohesive but was not as plastic as the product obtained using the larger amount of polymerization regulator.

Example 3

A synthetic rubber-like-material was prepared as follows:

|  | Parts |
|---|---|
| Isoprene | 150 |
| a-Methyl-p-methyl styrene | 20 |
| Acrylonitrile | 30 |
| Water | 300 |
| Sodium stearate | 10 |
| Primary amide predominantly consisting of 11-mercaptyl undecanoamide containing a minor amount of 10-mercaptyl undecanoamide | 1 |
| Potassium persulfate | 1 |
| Sodium hydroxide | 0.1 |

The emulsion was agitated for 5 days at room temperature and the latex then coagulated. The rubber-like product was quite plastic and millable and could be compounded with the usual vulcanizing and modifying agents normally employed with rubber.

Example 4

A synthetic rubber-like material was prepared as follows:

|  | Parts |
|---|---|
| Isoprene | 1200 |
| Water | 1800 |
| Sodium stearate | 36 |
| Primary amide predominantly consisting of 11-mercaptyl undecanoamide containing a minor amount of 10-mercaptyl undecanoamide | 6 |
| Potassium persulfate | 6 |
| Sodium hydroxide | 0.6 |

The emulsion was agitated for about 60 hours at about 40° C. and the latex then coagulated. The product was similar to unvulcanized natural rubber and was relatively plastic and millable.

Example 5

A relatively plastic and millable, synthetic rubber-like material similar to unvulcanized, natural rubber may be prepared as follows:

|  | Parts |
|---|---|
| Isoprene | 840 |
| Acrylonitrile | 360 |
| Water | 1800 |
| Sodium stearate | 36 |
| 11-sulfhydryl-undecanoanilide | 6 |
| Potassium persulfate | 6 |
| Sodium hydroxide | 0.6 |

The emulsion should be agitated for about 60 hours at about 40° C. and the latex then coagulated.

Example 6

A relatively plastic and millable, synthetic rubber-like material similar to unvulcanized, natural rubber may be prepared as follows:

|  | Parts |
|---|---|
| Isoprene | 1200 |
| Water | 1800 |
| Sodium stearate | 36 |
| 11-sulhydryl-N-cyclohexyl-undecanoamide | 6 |
| Potassium persulfate | 6 |
| Sodium hydroxide | 0.6 |

The emulsion should be agitated for about 60 hours at about 40° C. and the latex then coagulated.

In general, my polymerization regulators produce tackier and more cohesive synthetic rubber-like materials and clearly exert a regulatory effect upon the polymerization reaction.

Having described my invention in detail, it is obvious that various modifications may be made therein and that some features may be improved without others all without departing from the spirit or scope of my invention which is defined in the appended claims.

I claim:

1. The process which comprises polymerizing a material selected from the group consisting of an open chain, aliphatic conjugated diene containing 4 to 6 carbon atoms and a mixture of such a conjugated diene with a different copolymerizable compound including a vinyl radical in an aqueous emulsion in the presence of a polymerization regulator comprising an amide of an acid having the formula,

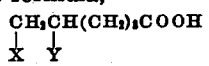

in which X and Y are different substituents selected from the group consisting of H and —SH.

2. The process which comprises polymerizing an open chain, aliphatic conjugated diene containing 4 to 6 carbon atoms in an aqueous emulsion in the presence of a polymerization regulator comprising an amide of an acid having the formula,

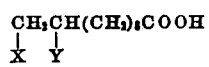

in which X and Y are different substituents selected from the group consisting of H and —SH.

3. The process which comprises polymerizing an open chain, aliphatic conjugated diene containing 4 to 6 carbon atoms in an aqueous emulsion in the presence of a polymerization regulator comprising a primary amide of an acid having the formula,

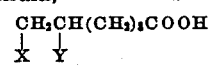

in which X and Y are different substituents selected from the group consisting of H and —SH.

4. The process which comprises polymerizing an open chain, aliphatic conjugated diene containing 4 to 6 carbon atoms in an aqueous emulsion in the presence of a polymerization regulator comprising a secondary amide of an acid having the formula,

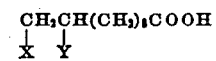

in which X and Y are different substituents selected from the group consisting of H and —SH.

5. The process which comprises polymerizing an open chain, aliphatic conjugated diene containing 4 to 6 carbon atoms with styrene in an aqueous emulsion in the presence of a polymerization regulator comprising 10-mercaptyl undecanoamide.

6. The process which comprises polymerizing isoprene with a copolymerization compound containing a single C=C linkage in an aqueous emulsion in the presence of a polymerization regulator comprising 11-mercaptyl undecanoamide.

7. The process which comprises polymerizing butadiene with a copolymerizable compound containing a C=C linkage in an aqueous emulsion in the presence of a polymerization regulator comprising a mixture of 10-mercaptyl undecanoamide and 11-mercaptyl undecanoamide.

8. The process which comprises polymerizing isoprene in an aqueous emulsion in the presence of a primary amide of an acid having the formula,

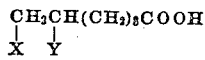

in which X and Y are different substituents selected from the group consisting of H and —SH.

9. The process which comprises polymerizing isoprene, alpha-methyl-para-methyl-styrene and acrylonitrile in an aqueous emulsion in the presence of a polymerization regulator comprising a primary amide of an acid having the formula,

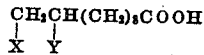

in which X and Y are different substituents selected from the group consisting of H and —SH.

10. The process which comprises polymerizing butadiene and styrene in an aqueous emulsion in the presence of a polymerization regulator comprising a primary amide of an acid having the formula,

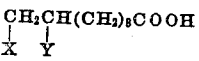

in which X and Y are different substituents selected from the group consisting of H and —SH.

11. The process of polymerizing an open chain, aliphatic conjugated diene containing 4 to 6 carbon atoms in an aqueous emulsion in the presence of a polymerization regulator comprising 11-sulfhydryl-undecanoanilide.

12. The process of polymerizing an open chain, aliphatic conjugated diene containing 4 to 6 carbon atoms in an aqueous emulsion in the presence of a polymerization regulator comprising 11-sulfhydryl-N-cyclohexyl-undecanoamide.

KARL H. WEBER.

No references cited.

Certificate of Correction

Patent No. 2,485,682                             October 25, 1949

KARL H. WEBER

It is hereby certified that errors appear in the printed specification of the above numbered patent requiring correction as follows:

Column 3, line 7, for that portion of the formula reading "CONCH" read *CONH*; lines 19 and 20, for "puriled" read *purified*; line 29, for "thonyl" read *thionyl*; column 4, line 9, for "refluring" read *refluxing*; line 14, and column 6, line 8, for "-sulhydryl-" read *-sulfhydryl-*;

and that the said Letters Patent should be read with these corrections therein that the same may conform to the record of the case in the Patent Office.

Signed and sealed this 14th day of February, A. D. 1950.

[SEAL]

THOMAS F. MURPHY,
                                          *Assistant Commissioner of Patents.*